F. LYTTLE.
COMBINED UTENSIL AND STRAINER.
APPLICATION FILED JAN. 23, 1918.
1,319,017.
Patented Oct. 14, 1919.
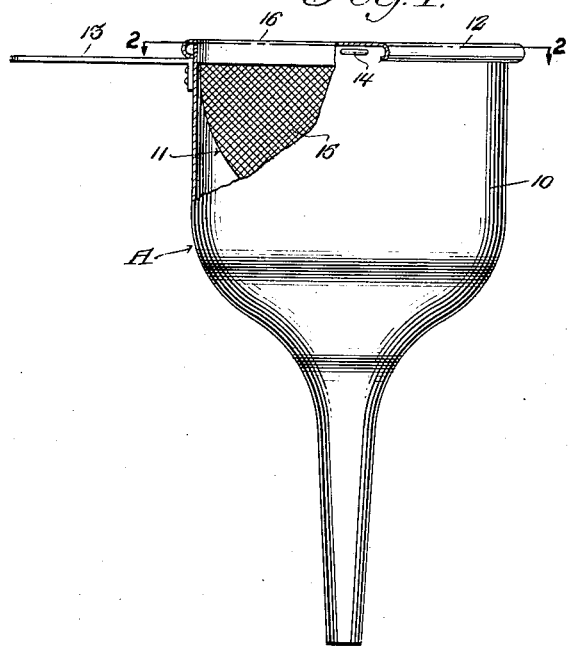
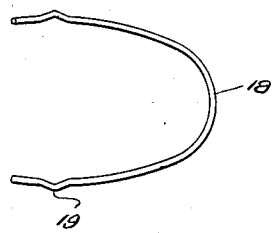
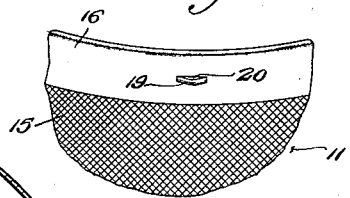
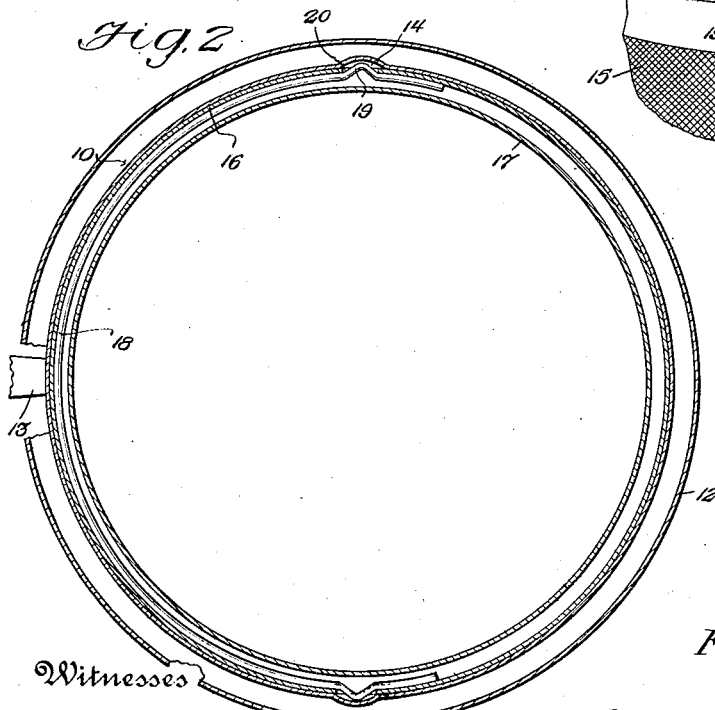
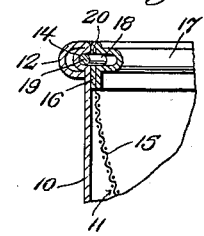
Inventor
Frances Lyttle,
By Victor J. Evans
Attorney
Witnesses
J H Crawford
T Hough

UNITED STATES PATENT OFFICE.

FRANCES LYTTLE, OF PASADENA, CALIFORNIA.

COMBINED UTENSIL AND STRAINER.

1,319,017.  Specification of Letters Patent.  Patented Oct. 14, 1919.

Application filed January 23, 1918. Serial No. 213,410.

*To all whom it may concern:*

Be it known that I, FRANCES LYTTLE, a citizen of the United States, residing at Pasadena, in the county of Los Angeles and State of California, have invented new and useful Improvements in Combined Utensils and Strainers, of which the following is a specification.

This invention relates to a combined utensil and strainer and more particularly to the means whereby the strainer is detachably retained in engagement with the funnel.

The primary object of the invention is to provide an implement of this character wherein a loop of novel construction is so arranged within a bead upon the strainer that when the strainer is arranged within the funnel the loop will extend within grooves at opposite sides of the funnel and yieldingly resist an attempt to move the strainer from the funnel.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:

Figure 1 is a view in side elevation partly in section of a combined funnel and strainer constructed in accordance with the invention.

Fig. 2 is an enlarged horizontal section on line 2—2 of Fig. 1.

Fig. 3 is a perspective view of a portion of the strainer.

Fig. 4 is a perspective view of the loop employed.

Fig. 5 is a fragmentary vertical section showing the manner of connecting the strainer and the funnel.

Like characters of reference denote corresponding parts throughout the several views in the drawing.

Referring now to the drawing in detail wherein there has been shown a combined funnel and strainer A constructed in accordance with the invention and with the funnel portion designated by the numeral 10 and the strainer portion by the numeral 11. The funnel 10 which is of the shape of articles of this character now in use is provided at its upper end with a circumferentially extending bead 12 and a handle 13. The funnel 10 is provided adjacent to its upper end with a pair of outwardly pressed portions which form within the bead of the funnel at diametrical opposite points, Figs. 1 and 5, recesses 14 which open out within the funnel and have the wall thereof curved throughout its length as clearly shown in Fig. 2 in the drawing.

The strainer 11 as is usual in articles of this character comprises a reticulated basket 15 which has connected therewith a band 16, although in this instance the band is provided in the portion thereof which lines within the strainer with a circumferentially extending bead 17 which serves as a housing for a U-shaped loop of resilient material 18, the arms of the loop 18 having formed therefrom ribs 19 which extend beyond the band 16 exteriorly of the strainer through openings 20 in the band and when these openings are in line with the recesses 14 the ribs 19 extend within the recesses and retain the strainer 11 in the funnel 10.

When the strainer is connected with the funnel as shown in Fig. 1 in the drawing and it is desired to disconnect these two articles the strainer is partially rotated within the funnel to cause the curved wall of the recesses 14 to force the ribs 19 within the bead 17, thus allowing the strainer to be removed from the funnel 10.

When it is desired to replace the strainer within the funnel the ribs 19 are held within the bead 17 with the fingers until the strainer has been arranged within the funnel after which, the strainer is turned until the ribs 19 project within the recesses 14.

From the foregoing description taken in connection with the accompanying drawing it is apparent that a combined strainer and funnel has been provided wherein means of novel construction has been provided for detachably connecting these articles with each other.

Having thus described the invention, what is claimed as new, is:—

1. The combination with a hollow utensil having seats in its wall at opposite points and in communication with its interior, of a second utensil removably arranged within the first named utensil and having an inwardly directed bead, and a resilient loop disposed in the said bead and provided with protuberances adapted to be sprung into and out of the seats of the first named utensil.

2. A hollow utensil having outwardly pressed portions therein, a strainer in said utensil, and a resilient loop mounted on said strainer having projections formed therefrom extending within said outwardly pressed portions.

3. A hollow utensil having a pair of diametrically opposite outwardly pressed portions therein, a strainer within said utensil having a circumferentially extending bead adjacent the top thereof, a resilient loop in said bead, and locking projections on said loop extending exteriorly of the bead and within said outwardly pressed portions of the utensil.

4. The combination with a hollow utensil having an exterior bead and also having opposite seats in its wall in the same plane as said bead, of a utensil arranged within the first named utensil and having an inwardly extending bead, and a resilient loop disposed in said bead and having protuberances adapted to be sprung into and out of engagement with the seats of the first named utensil.

5. The combination with a hollow utensil having opposite seats in its wall, of a utensil removably arranged within the first named utensil and having an interior bead, and a resilient loop disposed in said bead and having protuberances adapted to be sprung into and out of the seats in the first named utensil.

6. The combination with a hollow utensil having opposite seats in its wall of a utensil removably arranged in the first named utensil and having an interior bead, and resilient catches carried in the bead of the second named utensil and adapted to be sprung into and out of the seats of the first named utensil.

7. The combination with a hollow utensil having opposite seats in its wall, of a utensil removably arranged within the first named utensil and having opposite resilient catches to coöperate with the said seats for the connection and disconnection of the utensils, upon movement of one of the utensils about its axis and relative to the other utensil.

8. The combination of two hollow utensils removably arranged, one within the other with one utensil having a seat and the other utensil having a resilient catch movable into and out of the seat upon movement of one utensil about its axis relative to the other utensil.

In testimony whereof I affix my signature.

FRANCES LYTTLE.